United States Patent
Bauknecht et al.

(10) Patent No.: US 7,182,585 B2
(45) Date of Patent: Feb. 27, 2007

(54) ELECTRICALLY DRIVEN FLOW COMPRESSOR

(75) Inventors: Günter Bauknecht, Ulm (DE); Gerhard Huber, Wasserburg (DE)

(73) Assignee: GfAS mbH, Gesellschaft für Aufladetechnik und Spindelbau, Wasserburg (DE)

( * ) Notice: Subject to any disclaimer, the term of this patent is extended or adjusted under 35 U.S.C. 154(b) by 180 days.

(21) Appl. No.: 10/450,874

(22) PCT Filed: Dec. 18, 2001

(86) PCT No.: PCT/EP01/14940

§ 371 (c)(1),
(2), (4) Date: Oct. 17, 2003

(87) PCT Pub. No.: WO02/50408

PCT Pub. Date: Jun. 27, 2002

(65) Prior Publication Data

US 2004/0047752 A1    Mar. 11, 2004

(30) Foreign Application Priority Data

Dec. 19, 2000  (DE) ................. 100 63 321

(51) Int. Cl.
*H02K 9/00* (2006.01)
(52) U.S. Cl. ................. 417/423.8; 310/51
(58) Field of Classification Search .......... 417/366, 417/423.1, 423.7, 423.13, 423.14, 423.8, 417/367; 310/54, 52, 58, 59

See application file for complete search history.

(56) References Cited

U.S. PATENT DOCUMENTS

| | | | | |
|---|---|---|---|---|
| 2,913,988 A | * | 11/1959 | White | 417/357 |
| 3,475,631 A | * | 10/1969 | Bollibon et al. | 310/58 |
| 3,478,689 A | * | 11/1969 | Ball | 417/373 |
| 4,511,312 A | | 4/1985 | Hartwig | 417/45 |
| 5,350,039 A | | 9/1994 | Voss et al. | 184/6.16 |
| 5,363,674 A | | 11/1994 | Powell | 62/505 |
| 5,448,118 A | * | 9/1995 | Nakamura et al. | 310/54 |
| 5,577,883 A | | 11/1996 | Schutz et al. | 415/90 |
| 5,616,973 A | * | 4/1997 | Khazanov et al. | 310/54 |
| 5,674,056 A | * | 10/1997 | Yamamoto et al. | 417/366 |
| 5,674,057 A | * | 10/1997 | Guardiani et al. | 417/423.3 |
| 5,714,816 A | | 2/1998 | Jensen et al. | |
| 5,954,258 A | | 9/1999 | Baader et al. | |
| 6,069,426 A | | 5/2000 | Baader et al. | |
| 6,091,604 A | * | 7/2000 | Plougsgaard et al. | 361/707 |
| 6,293,769 B1 | * | 9/2001 | Radermacher et al. | 417/357 |

FOREIGN PATENT DOCUMENTS

| | | |
|---|---|---|
| DE | 2 206 450 | 8/1973 |
| DE | 35 39 782 | 5/1987 |
| DE | 93 05 174.3 U1 | 12/1993 |

(Continued)

*Primary Examiner*—Anthony Stashick
*Assistant Examiner*—Vikansha Dwivedi
(74) *Attorney, Agent, or Firm*—Baker & Daniels LLP

(57) ABSTRACT

The invention relates to an electrically driven flow compressor comprising a drive (2, 3)—and a flow compressor and a converter (5) for electrical supply and control of the drive unit (2, 3). According to the invention, the converter (5) and the drive unit (2, 3) form an integral arrangement. Said inventive flow compressor has a reduced size, excellent electromagnetic performance and reduced production costs compared to flow drives with an external frequency converter.

13 Claims, 1 Drawing Sheet

FOREIGN PATENT DOCUMENTS

Figure 1:
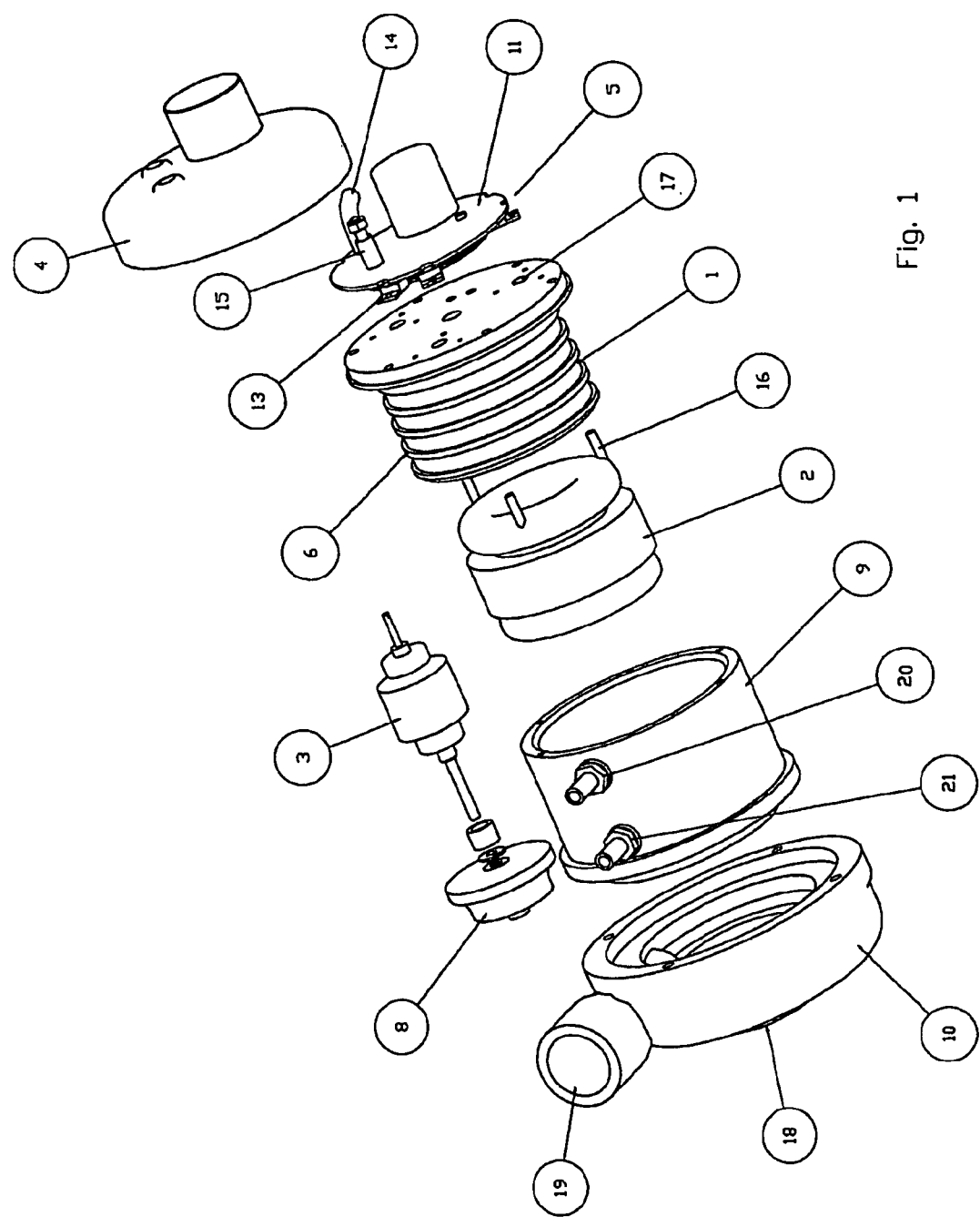
Figure 1:
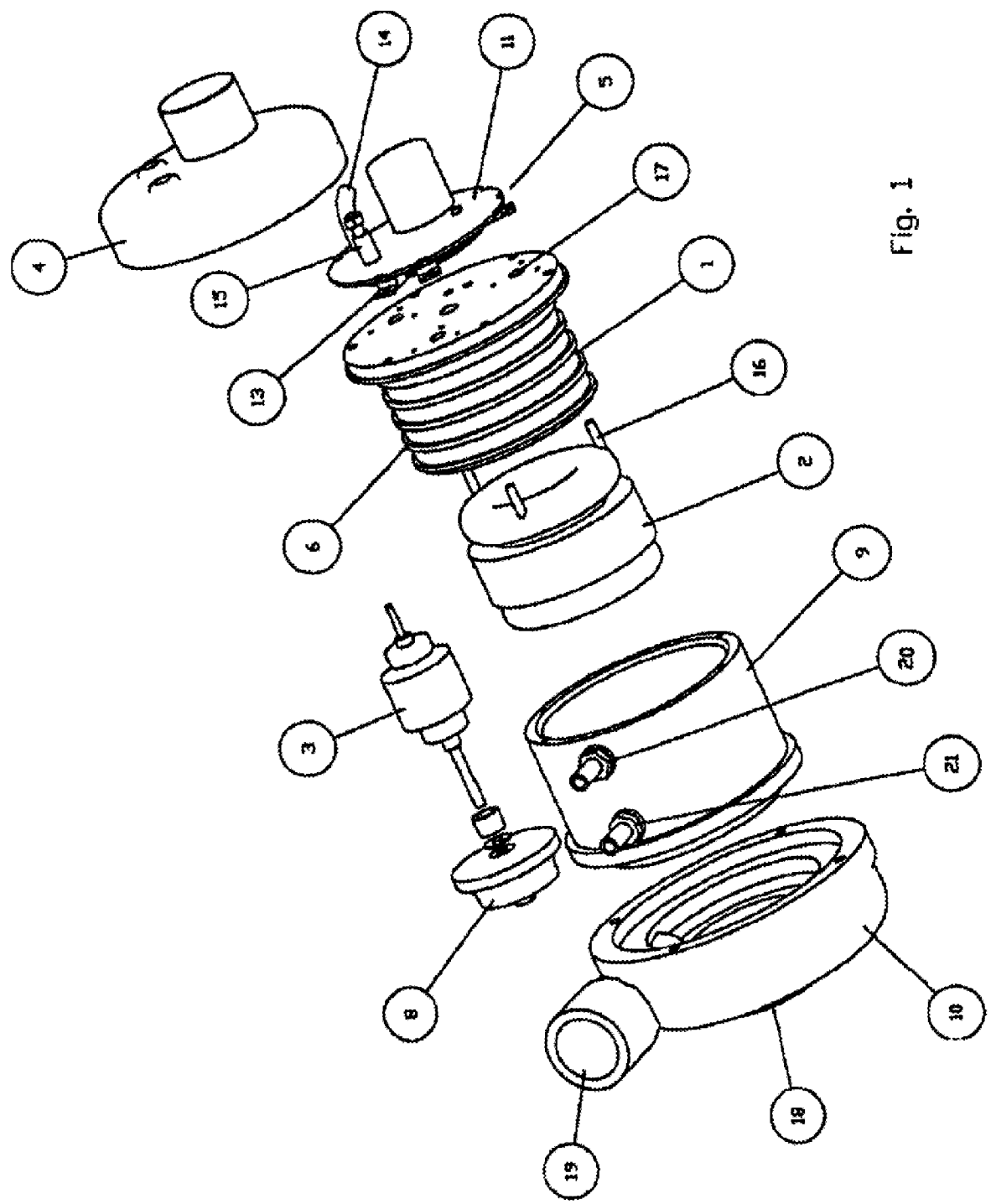

| | | |
|---|---|---|
| DE | 195 11 114 C1 | 8/1996 |
| DE | 196 26 213 | 1/1998 |
| DE | 197 26 258 A1 | 1/1998 |
| EP | 0 352 064 | 1/1990 |
| EP | 0 735 650 B1 | 8/1999 |
| GB | 1 396 082 | 5/1975 |
| RU | 2034999 C1 * | 5/1995 |

* cited by examiner

ELECTRICALLY DRIVEN FLOW COMPRESSOR

The invention concerns an electrically driven flow compressor for use in internal combustion engines that can be charged with an exhaust turbocharger.

A turbocharger is often used in modern internal combustion engines to improve performance and reduce fuel consumption and exhaust. In particular, diesel engines are being charged today, almost exclusively diesel engines in commercial vehicles, however an increasingly important subject is also the so-called downsizing of Otto engines, i.e. a smaller engine (cubic capacity) with approximately equal engine performance. The most common process currently is charging with exhaust turbo chargers.

An exhaust turbo charger works satisfactorily upon stationary operation of the internal combustion engine. In this operating condition, the internal combustion engine generates sufficient exhaust energy to be able to drive the exhaust turbine and thereby activate the compressor of the turbocharger.

In some applications, in particular for Otto engines with a spread-out rotation belt, there is a surplus of exhaust energy that would lead to an over-rev of the turbine shaft and/or excessively high charging pressure in conditions of unimpeded force on the turbine. The most common process to prevent such an occurrence is a vent valve arranged in front of the turbine that creates a bypass for the excess exhaust that is not used at the turbine. Recently, conducting devices, such as variable turbine geometry, have also been utilized. But these methods, too, use only a portion of the exhaust energy.

In non-stationary operation, i.e. when driving, accelerating, going uphill, decelerating, shifting gears, etc., which occurs primarily at small revolutions of the internal combustion engine, there is not enough exhaust energy to accelerate the exhaust turbo charger, on the one hand, and to generate sufficient charge pressure, on the other, to achieve the desired torque overload (e.g. for acceleration of the vehicle). This effect is called a "turbo hole" may only be moderated by reducing the "running shaft mass" and the interior friction of the exhaust turbocharger. This leads to ever smaller chargers with a higher number of revolutions (in excess of 200,000 l/min) and, because of the smaller flow cross-section, to an ever higher loss of flow and thereby to a poorer overall functioning. Therefore, only the large-volume engine has heretofore offered advantages.

The known solutions, the goal of which were to construct a internal combustion engine that was smaller, lighter and more cost effective, use an exhaust turbocharger with an additional electric motor to maintain rpm rate of the turbine. Such solutions have been made public, for example, in EP 0 352 064 A1, DE 35 39 782 A1 or DE 22 06450 A1.

Another solution is to use an electrically driven flow compressor, in addition to an exhaust turbo charger, whose drive unit is supplied with electrical current by a separate voltage system converter. This voltage system converter is for the most part large and heavy. The current power supply of the drive unit takes place via leads that themselves isolate electromagnetic voltage (EMV) using significant screening measures.

In connection with other areas of use, electrically driven compressors are known in which the motor and the control electronics are placed in a common housing. A fluid pump of this type has been published in U.S. Pat. No. 4,511,312 A. A vacuum pump is known from U.S. Pat. No.5,577,883 A in which the exterior pump housing is cooled by water. Cooling of the motor and or the electronics is not described. U.S. Pat. No. 5,363,674 A describes a compressor for a gaseous coolant in which the motor is arranged within the flow of the coolant so that an exchange of heat between the motor and the coolant can take place. A dedicated cooling circuit for the motor and the electronics is not described. U.S. Pat. No. 5,350,039 A also describes a compressor for a gaseous coolant in which both the motor and the electronics are in the flow of the coolant.

A dedicated cooling circuit and a common cooling element for the motor and the electronics is not provided for.

DE 196 26 213 C2 describes an electric drive with fluid cooling for the drive and the performance electronics. A cooling circuit for a liquid coolant is formed by cooling channels that are integrated in the manufacturing of a housing and a bearing shield with integrated cooling channels is relatively expensive.

The task of the invention is to improve an electrically driven flow compressor with respect to is design size, its EMV ratio and is production costs.

According to the invention, the voltage system converter and the electric drive unit have an integral arrangement. The advantage of this arrangement is its compact design, i.e. in the compact arrangement of the drive unit and the voltage system converter. Both elements are placed close to each other in the design so as to yield advantages with respect to design size, the EMV ratio and manufacturing and service costs. The integral arrangement of the drive unit and the voltage system converter achieves significant advantages related to cooling of these components due to the fact that one and same cooling element can be used to cool the performance electronics of the voltage system converter and the drive unit. Because the drive unit has relatively high electrical power consumption, the unit utilizes a cooling circuit with a liquid coolant in a preferred execution form. The voltage system converter is preferably linked to the cooling circuit of the drive unit.

Placing the integral arrangement in a common housing is advantageous.

The stator box of the drive unit is preferably used as a cooling element for the drive unit and the performance electronics of the voltage system converter, on whose end-wall the performance electronics are arranged. By connecting the voltage system converter to the cooling circuit of the drive engine, a separate cooling of the voltage system converter is not necessary, i.e. using air or liquid. The voltage system converter can be operated in the same cooling circuit as the drive engine.

The connection leads between the drive unit and the voltage system converter are preferably kept very short—e.g. only a few millimeters—and arranged within the housing. This will cause only a very small fraction of electromagnetic radiation to be given off by these leads into the environment. This is particularly important because there is a negative effect on the environment when used in vehicles, viewed particularly in light of the great number of vehicles that leads to significant environmental burdens in areas of high density.

A preferred execution form is that the voltage system converter is linked with the drive unit via plug-in connections. A complete voltage system converter unit can be arranged and linked to the drive unit using a few fastening points. The connection of the voltage system converter with the drive unit can be a plug-in connection, whereby assembly and disassembly becomes particularly easy. Even in cases of service, the exchange of the voltage system converter can be performed easily.

Because the configure of the drive unit and voltage system converter described in the invention is designed to be very compact, a cost-effective solution is achieved. Costly additional cooling measures, leads and separate housings are avoided. The complete voltage system converter can be achieved in a hybrid design and/or as an ASIC.

Another advantage is also the possibility of using a two-phase or higher motor as a drive unit. This can raise torque or reduce the current load.

In the following the invention will be explained in greater detail using an execution example with reference to two illustrations. The illustrations and the description provide further characteristics, advantages and applications of the invention.

Figure 2:
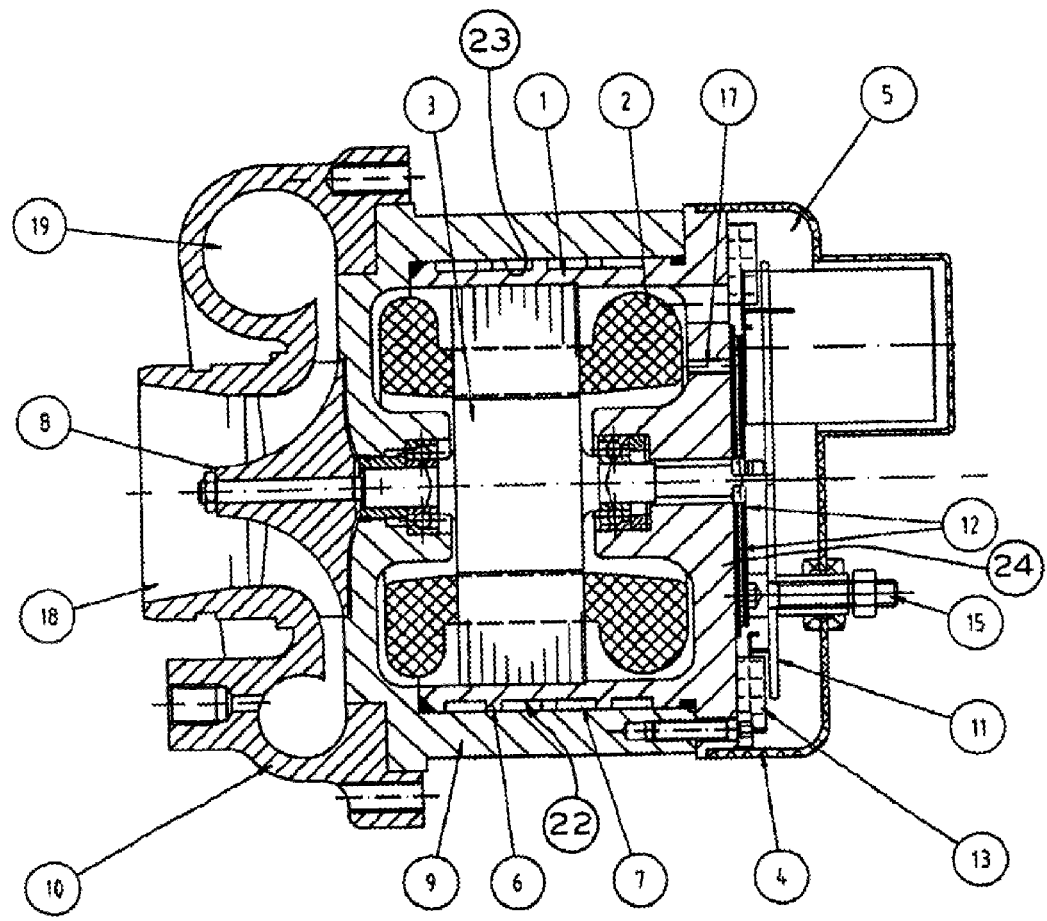

They show:

FIG. 1: a blow-up display of the flow compressor described in the invention;

FIG. 2: a lengthwise cross-section of the flow compressor.

The drive unit of the flow compressor shown in FIG. 1 encompasses a stator 2 with a multiphase winding packet with corresponding winding connections 16 and a rotor with shaft 3, which is attached in a rotationally fixed manner in the stator 2. The rotor shaft is, on the one hand, received in a stator box 1 that surrounds the stator 2 and, on the other hand, in a housing 9, which houses the stator 2 and the stator box 1. The rotor shaft 3 has a compressor wheel 8 on one end, which works and rotates in a compressor housing 10 connected to the housing 9. The compressor housing has a compressor inlet 18 and a compressor outlet 19. The performance electronics 13 of the voltage system converter 5 described in the invention are installed on the cover side of the housing portion of the stator box 1 and connected with the control electronics 11 above. The performance transistors of the performance electronics 13 are linked directly via feed opening 17 in the stator box with the winding connection 16 of the stator 2. The required wire length of the leads, i.e. the wiring connections, is kept to a minimum. The voltage system converter 5 must only be connected to its power supply connection 15 with direct voltage of the vehicle's onboard power supply whose leads do not have portions of alternating current and therefore do not have any harmful EMV emission. The control functions for the voltage system converter 5 are realized via a separate lead 14 that comprise an inlet and outlet for the set-point requirements for rpm or current, rpm actual value, etc.

The entire voltage system converter 5 covered by a cover 4.

There is an empty space 7 between the perimeter of the stator box 1 and the housing 9 for purposes of receiving a liquid coolant that will be taken in and re-circulated in the empty space via a coolant inlet 20 and a coolant outlet 21. As shown in FIG. 2, the space 7 is formed between the outer surface 22 of stator box 1 and the inner surface 23 of housing 9. The stator box 1 can have ribs 6 on its outer surface to increase the surface area and improve cooling.

As can be seen in FIG. 2, the performance electronics 13 are arranged directly on the back end wall 24 of the stator box 1 and connected to it in a heat conducting fashion so that the performance transistors 13 are cooled simultaneously by the cooling of the stator box 1. The stator box 1 forms the cooling element for both the performance electronics 13 of the voltage system converter 5 and the drive unit. The conducting of current to the performance transistors and via the feedthroughs 17 to the wiring packets of the stator 2 occurs via the wire surfaces 12 of the large cross-section because it is here that peak current of 100 or a few hundred ampere can occur. The printed circuit board with the control electronics 11 is arranged above the performance electronics 13 whereby the entire voltage system converter block is covered by a cover 4. The drive unit and the voltage system converter are thereby located in one common housing so that the lead paths are kept short and performance loss is minor and no unwanted emissions from the voltage system converter 5 can escape.

ILLUSTRATED LEGEND

1 Sator Box
2 Stator
3 Shaft/Rotor
4 Cover
5 Voltage System Converter
6 Ribs
7 Empty Space
8 Compressor Wheel
9 Housing
10 Compressor Housing
11 Control Electronics
12 Wire Surfaces
13 Performance Electronics
14 Control Leads
15 Power Supply Connection
16 Wiring Connections
17 Boring
18 Compressor Inlet
19 Compressor Outlet
20 Coolant Inlet
21 Coolant Outlet

The invention claimed is:

1. An electrically driven flow compressor with a drive unit and a compressor unit, comprising:
 a voltage system converter to supply electricity and control the drive unit whereby the voltage system converter and the drive unit have an integral arrangement that is placed in a common housing that comprises a housing part, a stator box and a cover;
 performance electronics of the voltage system converter being mounted on a bearing shield side of the stator box,
 the voltage system converter being cooled by a common cooling element formed by the stator box, cooling being performed by a cooling circuit for a liquid coolant in which there is an empty space to receive the coolant between the perimeter of the stator box and the housing part, the coolant circulating around the stator box;
 an external coolant inlet and an external coolant outlet in fluid communication with said empty space such that the cooling circuit is separate from fluid compressed by said compressor unit;
 the stator box being coaxially nested inside the housing part and said empty space being formed by an outer surface of said stator box and an inner surface of said housing part; and
 ribs on the outer surface of said stator box to thereby increase the effective surface area of the stator box outer surface;
 said stator box including an integral end wall at the bearing shield side of said stator box, said end wall having a surface, at least part of said performance electronics being disposed directly on said stator box end wall surface to thereby cool said at least part of said performance electronics;

said housing part having an integral end wall on a side of said drive unit opposite said stator box end wall.

2. The flow compressor as described in claim 1, wherein connection leads are fed between the drive unit and the voltage system converter within the housing.

3. The flow compressor as described in claim 2, wherein the voltage system converter is designed as a compact, exchangeable unit.

4. The flow compressor as described in claim 2, wherein the voltage system converter is connected via a plug-in connection with the drive unit.

5. The flow compressor as described in claim 2, wherein the drive unit is a three-phase or higher electric motor.

6. The flow compressor as described in claim 1, wherein the voltage system converter is designed as a compact, exchangeable unit.

7. The flow compressor as described in claim 6, wherein the voltage system converter is connected via a plug-in connection with the drive unit.

8. The flow compressor as described in claim 6, wherein connection leads are fed between the drive unit and the voltage system converter within the housing.

9. The flow compressor as described in claim 1, wherein the voltage system converter is connected via a plug-in connection with the drive unit.

10. The flow compressor as described in claim 9, wherein the drive unit is a three-phase or higher electric motor.

11. The flow compressor as described in claim 9, wherein connection leads are fed between the drive unit and the voltage system converter with housing.

12. The flow compressor as described in claim 1, wherein the drive unit is a three-phase or higher electric motor.

13. The flow compressor as described in claim 12, wherein connection leads are fed between the drive unit and the voltage system converter within the housing.

* * * * *

UNITED STATES PATENT AND TRADEMARK OFFICE
CERTIFICATE OF CORRECTION

PATENT NO. : 7,182,585 B2  
APPLICATION NO. : 10/450874  
DATED : February 27, 2007  
INVENTOR(S) : Gunter Bauknecht et al.

Page 1 of 1

It is certified that error appears in the above-identified patent and that said Letters Patent is hereby corrected as shown below:

Claim 11, Column 6, Line 11, delete "with" and insert --within the--

Signed and Sealed this

Sixteenth Day of October, 2007

JON W. DUDAS  
*Director of the United States Patent and Trademark Office*

UNITED STATES PATENT AND TRADEMARK OFFICE
CERTIFICATE OF CORRECTION

PATENT NO. : 7,182,585 B2
APPLICATION NO. : 10/450874
DATED : February 27, 2007
INVENTOR(S) : Bauknecht et al.

It is certified that error appears in the above-identified patent and that said Letters Patent is hereby corrected as shown below:

Delete Drawing sheet and substitute therefor the Drawing sheets consisting of FIG 1-2 as shown on the attached pages.

Signed and Sealed this

Twenty-fifth Day of November, 2008

JON W. DUDAS
*Director of the United States Patent and Trademark Office*